US007946148B2

(12) United States Patent
Getman et al.

(10) Patent No.: US 7,946,148 B2
(45) Date of Patent: May 24, 2011

(54) MANUFACTURING-SIDE CALIBRATION OF A MEASURING DEVICE FOR CAPACITIVE FILL LEVEL MEASUREMENT, AND CORRESPONDING MEASURING DEVICE

(75) Inventors: Igor Getman, Lörrach (DE); Armin Wernet, Rheinfelden (DE); Roland Dieterle, Lörrach (DE); Kaj Uppenkamp, Wehr (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 323 days.

(21) Appl. No.: 11/663,206

(22) PCT Filed: Sep. 13, 2005

(86) PCT No.: PCT/EP2005/054540
§ 371 (c)(1),
(2), (4) Date: Sep. 19, 2007

(87) PCT Pub. No.: WO2006/034959
PCT Pub. Date: Apr. 6, 2006

(65) Prior Publication Data
US 2008/0042658 A1 Feb. 21, 2008

(30) Foreign Application Priority Data
Sep. 28, 2004 (DE) .................. 10 2004 047 413

(51) Int. Cl.
*G01F 19/00* (2006.01)
*G01F 23/26* (2006.01)
*G01R 35/00* (2006.01)
(52) U.S. Cl. .................. 73/1.73; 73/304 C; 324/601
(58) Field of Classification Search ............. 73/1.73, 73/304 C
See application file for complete search history.

(56) References Cited

U.S. PATENT DOCUMENTS

| 3,072,844 A * | 1/1963 | Doll .......................... 324/679 |
| 4,383,444 A * | 5/1983 | Beaman et al. ............ 73/304 C |
| 5,088,325 A | 2/1992 | Eichberger et al. |
| 5,245,873 A | 9/1993 | Fathauer |

FOREIGN PATENT DOCUMENTS

DE 1 275 777 5/1965
(Continued)

OTHER PUBLICATIONS

Claudius Peters AG, Title: Dispositif Pour Indiquer Le Degre de Remplissage de Reservoirs de tout Genre et Specialement Des Soutes, Silos, et Leurs Equivalents, BE 567 234 A, Aug. 12, 1960, pp. 1, 3 and 6.

*Primary Examiner* — Hezron Williams
*Assistant Examiner* — Nathaniel Kolb
(74) *Attorney, Agent, or Firm* — Bacon & Thomas, PLLC

(57) ABSTRACT

A method for manufacturing-side calibration of a measuring device for capacitive fill level measurement of a medium, wherein at least one probe unit of the measuring device is activated with an electrical, alternating voltage of a predeterminable frequency. As a function of the frequency of the activating signal, a conductivity range is determined, within which the fill level measurement is essentially independent of a change of the electrical conductivity of the medium; for such conductivity range, at least a first reference matching between a predeterminable, first fill-level value and a first capacitance value belonging to the first fill-level value is produced; and the first reference matching between the first fill-level value and the first capacitance value is recorded. Additionally, the invention relates to a corresponding measuring device.

6 Claims, 6 Drawing Sheets

FOREIGN PATENT DOCUMENTS

| | | |
|---|---|---|
| DE | 294 783 A5 | 10/1991 |
| DE | 40 25 400 C1 | 4/1992 |
| DE | 101 61 069 A1 | 6/2003 |
| DE | 103 22 279 A1 | 12/2004 |
| DE | 10 2004 008 125 A1 | 9/2005 |

* cited by examiner

MANUFACTURING-SIDE CALIBRATION OF A MEASURING DEVICE FOR CAPACITIVE FILL LEVEL MEASUREMENT, AND CORRESPONDING MEASURING DEVICE

TECHNICAL FIELD

The invention relates to a method for manufacturing-side calibration of a measuring device for capacitive fill level measurement of a medium, wherein at least one probe-unit of a measuring device is activated with an electrical, activating signal, i.e. the input signal, in the form of an electrical, alternating voltage of predeterminable frequency. Additionally, the invention relates to a corresponding measuring device.

BACKGROUND OF THE INVENTION

"Manufacturing-side" means that the calibration is performed at the manufacturer's location as a part of the fabrication, or production, of the measuring device. The capacitive method permits a continuous measurement of fill level. In such case, the probe-unit and the container wall (or a second probe-unit) form a capacitor, whose dielectric is the medium in the container. The capacitance of this capacitor is, in such case dependent on, among other things, the fill level of the medium, so that, from the capacitance, the fill level can be deduced. Various possibilities for measuring the capacitance are set forth in, for example, the Offenlegungsschrifts DE 01 57 762 A1 or DE 101 61 069 A1 of the assignee.

Problematic is the fact that the measured capacitance depends not only on fill level but also on the dielectric constant and conductivity of the medium. Since the conductivity changes e.g. as a function of temperature, or the humidity of the air, measurement uncertainties, or limitations as regards application, result. Additionally, also the geometry of the container and, for instance, accretions on the probe unit, affect the measured values.

Another difficult area, in view of the multiple dependencies of the variables of concern, is the correlating of the capacitance value determined from the measurement and the matching fill-level value actually of interest. Consequently, usually a so-called calibration is required, in which, following installation of the measuring device, various fill levels are brought about, using the medium to be measured, and the capacitance values resulting from such fill levels are recorded. Such a calibration, however, involves much effort and stands in the way of a direct start-up of the measuring device following installation.

SUMMARY OF THE INVENTION

An object of the invention, therefore, is to provide a method for manufacturing-side calibration of a measuring device for capacitive fill level measurement and a correspondingly calibrated, or calibratable, measuring device.

The invention achieves the object, as regards the method, by the features that: As a function of the frequency of the activating signal, a conductivity range is determined, within which the fill level measurement is essentially independent of a change of electrical conductivity of the medium; for the conductivity range, at least a first reference matching between a predeterminable, first fill-level value and a first capacitance value belonging to the first fill-level value is produced; and that the first reference matching between the first fill-level value and the first capacitance value is recorded.

A measuring device for capacitive fill level measurement includes usually a probe unit, which is activated with an electrical, activating signal from a control/evaluation unit. The electrical, activating signal is an electrical, alternating voltage of predeterminable frequency. This is the usual form of the activating signal in the case of a capacitive measuring device. The response, or output, signal resulting therefrom is usually an electrical current signal, which is e.g. converted via a resistor into a digitizable, voltage signal. From the electrical response signal of the probe unit, which is, thus, also the response signal of the capacitor, dependent on the capacitance of the capacitor formed by the probe unit, container wall (or second probe unit) and medium, the capacitance value is then ascertained. For this, a calculational algorithm is required, which evaluates e.g. the admittance of the response signal, its magnitude, and the phase between activating signal and response signal. For this, for example, a microprocessor is provided in the control/evaluation unit. The activating signal is usually an electrical, alternating voltage of adjustable frequency. The manufacture of these components of the measuring device correspond to the state of the art.

Now, the invention provides that, in the fabrication/manufacture/production of the measuring device, at least one reference matching between a first, adjustable, fill-level value and the capacitance value belonging thereto is produced. In the fabrication/manufacture of the measuring device, thus, already, a calibration is carried out. The different possibilities for producing such a reference matching are discussed in the following embodiments. The deciding factor, that such a pre-calibration is possible, and that it is applicable for subsequent use, is that the conductivity of the medium for which the measuring device will be used, lies within a predetermined conductivity range. The range of applicability is, thus, limited to media with corresponding conductivities. This range is generally upwardly open, or unlimited. The beginning of the range depends on, among other things, the frequency of the activating signal (most often, an electrical alternating voltage). At a frequency of 250 kHz, the beginning lies, for example, at about 150 µS. At a higher frequency, this beginning value would lie higher, while, at a lower frequency, it would be lower. Due to this frequency dependence, it is necessary, first of all, to ascertain the matching conductivity range for the given frequency. This can be done e.g. by comparative measurements. In the following embodiments, an opportunity for expanding this range of applicability in the direction of lower conductances will be explained.

The reason for this focus on the conductivity range of applicability is that it has been found that properties of a medium, such as conductivity, but also the dielectric constant, have scarcely any effect on the measurement signal, when conductivity lies within the mentioned range. Since, consequently, dependence on medium is removed, calibration can then be performed as a part of the manufacture. Consequently, it is then, indeed, possible to make measurements with such a measuring device directly following installation.

The invention can thus be summarized as follows: By limiting the range of applicability to media having a conductivity above a certain value, a calibration then becomes possible as a part of the manufacture. Or, conversely, the measuring device is used with the manufacturing-side pre-calibration only for those media whose conductivity falls in the range of applicability.

One variant of the method provides that at least a second reference matching between a second, predeterminable fill-level value and a second capacitance value belonging to the second fill-level value is produced, and that the second reference matching between the second fill-level value and the second capacitance value is recorded. If only one reference matching is recorded, then one can distinguish between the exceeding, and falling beneath, of the fill level associated therewith. Two values, however, permit the recognizing of these two values, and, besides, it is then also possible to calculate and ascertain values between them.

An embodiment of the method of the invention provides that the frequency of the activating signal is predetermined in such a manner that accretion, or build-up, on the probe unit affects the fill level measurement only minimally, if at all. This embodiment is based on that fact that accretion sensitivity depends on the frequency of the activating signal, with a higher frequency providing a higher accretion tolerance. A higher frequency is, however, associated with a higher energy requirement, and, furthermore, the lower limit for the conductivity range, within which a change of the conductance has no, or only negligible, effect on the ascertained value of capacitance, is shifted in the direction of higher conductance. This means that a higher accretion tolerance is connected with a decreased range of applicability. Consequently, frequency is to be selected such that the effects of the accretion are minimal, but that, at the same time, the conductivity range is as large as possible. Practically, thus, a compromise must be found between these two opposing requirements.

The following embodiments concern the manner in which the reference matchings are produced during manufacture.

One embodiment of the method of the invention includes that at least one reference matching is produced between a predetermined fill-level value and a capacitance value belonging to the fill-level value in a manner such that a calibration medium is selected or adapted in such a manner that the electrical conductivity of the calibration medium lies within the determined conductivity range, that the fill-level value is brought about in a calibration container using the calibration medium, and that, at the set fill-level value, the value of capacitance is ascertained with the measuring device. Thus, during manufacture, calibration measurements are performed. The calibration medium must, in such case, only be distinguished by the fact that its conductivity lies within the given conductivity range. Advantageously, a calibration medium is used which is easy to work with and, especially, also safe, i.e. not dangerous, an example being water. With this calibration medium, then, in a calibration container of geometry selected to be as optimum as possible, the predetermined value of fill level is brought about, and the capacitance value associated therewith is measured. A calibration measurement performed in this way has also the advantage that manufacturing tolerances, especially those of the probe unit, are taken into consideration, since the effects of the geometry of the probe unit are simultaneously directly incorporated in the measurement.

An embodiment of the method of the invention provides that at least one reference matching between a predetermined fill-level value and a capacitance value belonging to the fill-level value is produced by calculating the capacitance value matched to the fill-level value of the medium. In the calculation, the geometry and material properties of the probe unit can be taken into consideration, as appropriate. By "geometry" is meant generally the relevant dimensions, such as length, diameter, etc., and, also, whether the probe unit is insulated and the situation as concerns the respective, individual dimensions. The material properties of the probe unit are, for example, its conductivity value, its dielectric constant, etc. If all required data concerning geometry and material properties are known, then the capacitance value associated with a predetermined fill-level value can be calculated. As appropriate, the capacitance value is calculated also taking into consideration the geometry of the container in which the measuring device is to be used.

The value of capacitance in the case of empty-calibration (the probe unit is thus not covered by medium) is given in the case of a rod probe e.g. by the following formula (this is thus an example for the calculational formula; depending on the embodiment of the measuring device and also the container, suitable modifications are required):

$$Capacitance_{empty} = \frac{1}{\frac{1}{2\cdot\pi\cdot\varepsilon_{insul}\cdot\varepsilon_0\cdot Probelength} + \frac{1}{2\cdot\pi\cdot\varepsilon_0\cdot Probelength}} + \underbrace{\phantom{XXXX}}_{Basecapacitance}$$
$$\ln\left(\frac{diameter_{insul}}{diameter_{rod}}\right) \quad \ln\left(\frac{Containerdiameter}{diameter_{insul}}\right)$$

In such case, the probe length Probelength, rod diameter $diameter_{rod}$, and diameter of the insulation surrounding the rod $diameter_{insul}$, as well as the dielectric constant of the insulation $\varepsilon_{insul}$, must be known. Additionally, the container diameter Containerdiameter is required. As regards the container, it should preferably be a prismatic container, i.e. its cross sectional area is constant over the entire height, since, otherwise, corresponding linearizing calculations are necessary. The base capacitance Ba sec apaci tan ce is the capacitance already contributed by the measuring device as a whole. The base capacitance is thus the sum of the capacitances measurable at the connection of the probe to the control/evaluation unit. Thus value can be ascertained e.g. from comparison measurements (more regarding this in the description of the figures below).

A second value, for the complete covering of the probe unit with medium, is given by the following equation:

$$Capacitance_{full} = \frac{1}{\frac{1}{2\cdot\pi\cdot\varepsilon_{insul}\cdot\varepsilon_0\cdot Probelength} + \frac{1}{2\cdot\pi\cdot\varepsilon_{medium}\cdot\varepsilon_0\cdot Probelength}} + Basecapacitance$$
$$\ln\left(\frac{diameter_{insul}}{diameter_{rod}}\right) \quad \ln\left(\frac{Containerdiameter}{diameter_{insul}}\right)$$

In the case of this formula, additionally appearing is the dielectric constant of the medium: $\varepsilon_{medium}$. Changes of the dielectric constant of the medium, $\varepsilon_{medium}$, have, in such case, a negligible effect. If the probe unit is composed of a foundational probe rod and a probe insulation surrounding such, then this can be explained as follows: The system, which is formed of the probe unit, the container, and the medium, can be thought of as two capacitors, which are connected in series. One capacitor Ci is that between probe rod and medium, where the probe insulation forms the dielectric, and the other capacitor Cm is that between the probe insulation and the container wall, where the medium forms the dielectric. For the given conductivity range essential for the invention, the conductivity of the medium is much greater than the susceptance of the "medium-capacitor" Cm. Consequently, the medium-capacitor is almost short circuited, and, between the probe rod and the container wall, there is, quasi, alone the "insulation-capacitor" Ci, whereby also the dependence on the dielectric constant, $\varepsilon_{medium}$, of the medium for this range of the conductivity, in which the measuring device is to be used, drops out.

An embodiment of the method of the invention provides that at least one reference matching between a predetermined fill-level value and a capacitance value belonging to the fill-level value is produced by selecting, from calculated and/or ascertained matchings between fill-level values and capacitance values, that capacitance value corresponding to the fill-level value. Thus, calculated or measured matchings are recorded and the capacitance belonging to the chosen fill level is selected from these, or, starting with these, the reference matchings e.g. for the given probe length, are calculated. As can be seen from the formulas above, it can be necessary also to take into consideration the geometry of the container.

A further development is that, in the case where two reference matchings have been produced, the stored first and second reference matchings are used to calculate at least a third reference matching, which is, for example, stored in a memory unit. Thus, on the basis of known reference matchings, intermediate values are calculated. For this, a facilitating situation is e.g. the case where the relationship between fill level and capacitance is linear.

The invention achieves the object, additionally, with a measuring device for capacitive fill level measurement, which is calibrated according to the method of the invention in at least one of the above embodiments. Such a measuring device usually ascertains the fill level of a conductive medium in a container. It includes, usually, at least one probe unit and at least one control/evaluation unit. The control/evaluation unit activates the probe unit with an electrical activating signal and receives from the probe unit an electrical response signal. Stored in the control/evaluation is at least one calculational algorithm, via which the control/evaluation unit ascertains from the response signal of the probe unit a capacitance value. In at least one storage, or memory, unit, according to the method of the invention, at least one reference matching between a capacitance value and a fill-level value is stored. The measuring device is, following installation in the container, calibration-free in the case that the electrical conductivity of the medium lies within a predetermined conductivity range. The measuring device operates, thus, using a memory unit, in which at least one reference matching between capacitance value and fill-level value determined in the manufacture is stored. Consequently, a calibration-free measurement is possible with this measuring device immediately following installation into the container, when the conductivity of the medium to be measured lies within the predetermined conductivity range, for which the pre-calibration was done in the manufacture. In such case, however, it is necessary to pay attention to the frequency of the activating signal, which is usually an electrical, alternating voltage. The frequency affects both the conductivity range, within with the conductivity value of the medium to be measured is permitted to be, in order that the measuring device can use the stored reference matchings, as well as also the accretion tolerance of the measuring device. The last point will still be discussed below. For enlarging the permissible conductivity range, in such case, a frequency as small as possible is desired, but for accretion tolerance, a frequency as high as possible is desired. Calibration-freedom of the measuring device thus means that a calibration for the measurements is no longer needed following installation. The measuring device can therefore be used directly following installation and the effort and costs of calibration on-site are avoided.

An embodiment of the measuring device of the invention provides that at least one control/evaluation unit is provided, which receives an electrical, response signal from the probe unit, and that, stored in the control/evaluation unit, is at least one calculational algorithm, via which the control/evaluation unit ascertains, at least on the basis of the amplitude and phase of the response signal of the probe unit, a capacitance value. The control/evaluation unit, most often, also activates the probe unit with the activating signal. Usually, only the magnitude of the response signal is evaluated. If, however, also amplitude and phase of the response signal relative to the activating signal are used, then more information is obtained. For this, for example, a microprocessor is provided in the control/evaluation unit, which directly samples the measurement signal or a variable proportional thereto. Usually, the response signal, which is most often an electrical current signal, is transformed into a voltage signal e.g. via a resistor, and the voltage signal is, in turn, digitized and thus made optimally accessible for the evaluation. This digitizing and, therewith, the evaluation e.g. of not only the magnitude of the response signal, is important, above all, for the following embodiment.

An embodiment of the measuring device of the invention includes that the calculational algorithm is optimized in such a manner that an expanded conductive range results, within which the fill level measurement is essentially independent of a change of the electrical conductivity. The calculational algorithm is thus, in other words, optimized in such a manner that an effect of the conductivity of the medium within the expanded conductivity range on the capacitance value ascertained by the control/evaluation unit is minimal, with this range being greater than the range already predetermined by the measuring principle and the "physics". The goal of this embodiment is to use the kind of evaluation to make the range of media for which the calibration-free measuring device is usable, as large as possible. To this end, for example, the coefficients of a polynomial can be determined in such a manner that a desired behavior of the polynomial as a function of conductivity results. In such case, however, it is always necessary to pay attention also to the effect of the frequency of the activating signal.

Thus, for example, a corrected amplitude Amplitude$_{calculated}$ can be represented, starting from the measured amplitude Amplitude$_{measured}$ and the measured phase $\phi_{measured}$ of the response signal, by a function (this gives then the optimizable calculational algorithm, which is, in this case, a calculational formula), which is, for example, a polynomial:

$$\text{Amplitude}_{calculated} = f(\text{Amplitude}_{measured}, \phi_{max}, \phi_{measured})$$

Appropriate coefficients are to be provided in the formula, for matching the function to the actual situation. In principle, it should be the fact that $\phi_{max} = \pi/2$, since the phase shift between the voltage and current signals basically assumes this value in the case of capacitors. The electronics, however, makes deviations from this value possible, so that it makes more sense to keep the angle $\phi_{max}$ variable. Using the coefficients, the expression can then be so optimized, that independence of conductance is assured for a largest possible range. Since this independence is mainly situated in the range of higher conductances, a special goal is to sink the value for the lower end of the range as much as possible, so that, in this way, in turn, also the application bandwidth of the measuring device is increased. Individual coefficients can additionally be provided, in order to value the phase information $\phi_{max}$ and $\phi_{measured}$ differently.

An embodiment of the measuring device of the invention includes that the control/evaluation unit evaluates the phase of the response signal as regards an accretion located on the probe unit. Behind this embodiment stands the recognition that not only material affects via fill level the phase of the response signal, but that also the accretion itself likewise affects the phase. Consequently, it is thus possible that an accretion has a negative influence on the ascertainment of the capacitance value and, therefore, also on the ascertainment of the fill-level value. It holds, thus, that the effects of accretion should be recognized and minimized as much as possible. An opportunity for accomplishing this is to increase the frequency of the activating signal, which is usually an electrical, alternating voltage. In this way, the accretion sensitivity is lessened. A further opportunity results from the observation that the phase of the response signal in the case of a change of the fill level can only lie within a phase range dependent on properties of the medium and on frequency. If a phase results which is outside of such range, then accretion is dominant and a reliable fill-level measurement is not, without special measures, possible. Therefore, from the phase information, information can be won concerning the accretion.

An advantageous embodiment of the measuring device of the invention provides that the control/evaluation unit ascertains from the response signal via the calculational algorithm, using the phase of the response signal, the capacitance value for the case in which the phase lies outside of a predeterminable accretion-dominated, phase range, wherein the accretion-dominated phase range includes the phases, which are measurable only in the case that an accretion is present on the probe unit. An idea of this embodiment is that the capacitance value and, via that, the fill-level value is then only ascertained via the optimized calculational algorithm when the phase lies in a range, in which it can lie because of fill level. Alternatively, also the phase difference between the measured phase and the maximum phase of 90° can be considered. If a phase has been determined, which lies outside of this range, respectively inside of the accretion-dominated phase range, then it is primarily a result of the accretion and use of the optimized calculational algorithm, which preferably makes use of the phase for evaluation, is no longer appropriate, in the absence of special measures. The "allowed" phase range can, however, be adjusted and predetermined also according to the desired, or required, measurement safety, with an increased requirement for safety being associated with a smaller phase range.

An embodiment includes that the control/evaluation unit ascertains from the response signal via the calculational algorithm, using the phase of the response signal, the capacitance value for the case in which the phase of the response signal lies within the accretion-dominated phase range. If the phase is greater, i.e. if the phase is within the accretion-dominated phase range, then the accretion is dominant, whereupon it is no longer sensible to calculate directly with the optimized, calculational algorithm. Therefore, a correction is required. This correction is, in particular, that the measured phase is not used, but, rather, a special, predetermined phase. Alternatively, a second calculational algorithm is specified, which decreases the dependence on phase. In an embodiment, the predetermined phase used in these cases instead of the measured phase, is the maximum phase difference, which is permitted to lie between the measured phase and the maximum/ideal phase of 90°. This, if the phase difference is greater than a limit value for the phase, then the capacitance value is subsequently calculated with this limit value.

The invention achieves the object, furthermore, by a measuring device for capacitive fill level measurement of a conductive medium in a container. The measuring device includes a probe unit and at least one control/evaluation unit, which activates the probe unit with an electrical, activating signal, and which receives from the probe unit an electrical, response signal, wherein, in the control/evaluation unit, at least one calculational algorithm is stored, via which the control/evaluation unit ascertains a capacitance value from the response signal of the probe unit. The measuring device of the invention is characterized in that the calculational algorithm is optimized in such a manner that a conductivity range results, within which the fill level measurement is essentially independent of a change of the electrical conductivity of the medium and that the control/evaluation unit is embodied in such a manner that it evaluates the phase of the response signal as regards an accretion located on the probe unit. With such a measuring device, it is possible to ascertain during manufacture at least one matching of a capacitance value to a fill level and to store such suitably in the measuring device.

Thus, a calibrateable measuring device is involved. This relates back to the fact that the dependence of the measurement on the conductivity of the medium and, thus, on the medium itself is removed, or minimized. Since the calculational algorithm is optimized, the range of applicability of the measuring is, in turn, as large as possible. Due to the evaluating of the phase, it is, furthermore, possible, that a measurement insecurity will be encountered because of effects of accretion on the probe unit. Since the phase is used preferably in the optimized calculational algorithm for ascertaining the capacitance value, it is necessary to assure that the phase is not primarily influenced by other process conditions. Such a process condition is, for example, accretion of the medium on the probe unit. Since accretion affects the phase, this is preferably monitored for evidence of accretion. The calibration can, thus, be done according to the above-described calibration method on the manufacturing-side, but it can, however, also be performed on-site, following installation. The other embodiments concerning the measuring device described above also hold correspondingly here.

BRIEF DESCRIPTION OF THE DRAWINGS

The invention will now be explained in greater detail on the basis of the appended drawings, the figures of which show as follows.

DETAILED DISCUSSION

Figure 1:
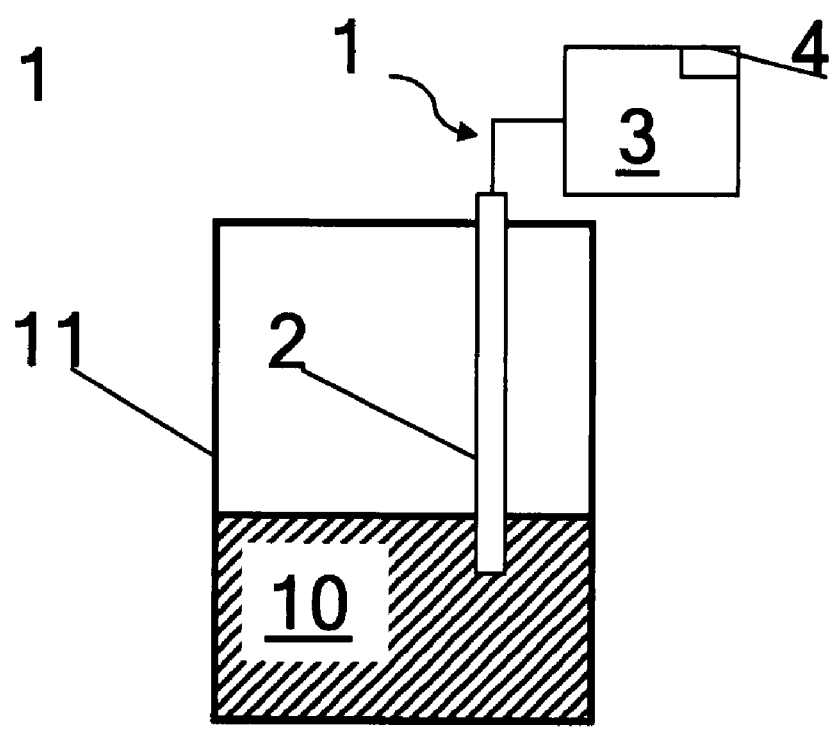
FIG. 1 a schematic drawing of use of a measuring device of the invention.

FIG. 1 shows use of the measuring device 1 for measuring fill level of a medium 10 in a container 11. The probe unit 2 is, in this case, a rod; alternatively, however, it can also be a wire rope. Also used are arrangements with plural measuring rods, or ropes, as the case may be. Probe unit 2, the wall of the container 11 and medium 10 form a capacitor. For ascertaining capacitance, probe unit 2 is supplied with an electrical, activating signal by the control/evaluation unit 3.

Usually, this is an electrical, alternating voltage. From the response signal of the probe unit 2 (most often, the response signal is an electrical-current signal, which is converted in the control/evaluation unit 3 into a voltage), the capacitance is then ascertained. Advantageously provided in the control/ evaluation unit 3 for this purpose is, first of all, a unit for digitizing the voltage form of the response signal and allowing for ascertainment of both amplitude and phase of the response signal. Advantageously, a microprocessor is provided in the control/evaluation unit, which directly samples or digitizes the response signal (electrical current signal) or a signal (voltage signal) proportional thereto. From the values of the response signal, the capacitance is then ascertained. Via the reference matching between capacitance value and fill-level value, as stored in the memory unit 4, the fill level of the medium 10 in container 11 is obtained, to the extent that the conductivity σ of the medium 10 lies within the predetermined conductivity range. This range begins at about 150 μS (this is true, when the measuring frequency, i.e. the frequency of the alternating voltage, is 250 kHz) and is open on the upper side (compare, in this connection, FIG. 2). This results alone from the physics of the situation. The lower limit can, however, be made smaller, as will be shown below.

Figure 2:
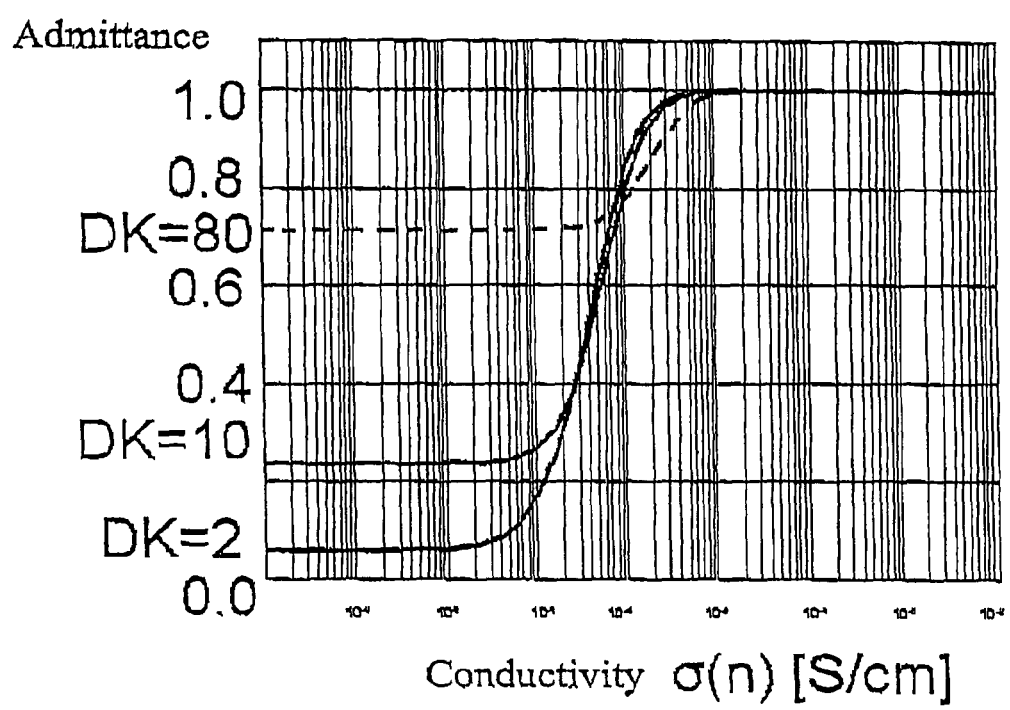
FIG. 2 plural curves for illustrating dependence of the measuring signal on conductivity and dielectric constant of the measured medium.

FIG. 2 presents different curves showing the effects of conductivity σ (as read on the x-axis) and dielectric constant DK (separate curves are provided for DK=2, 10, 80) on the measured admittance (thus, the amplitude) of the response signal. Admittance is read on the y-axis as normalized admittance. The admittance should actually be equal to 1 for all curves. The deviations result, however, first of all, due to the dependence on the conductivity σ of the medium. As can be seen, admittance decreases in the direction of decreasing conductivity. The degree of the decrease depends on the dielectric constant of the medium. There is thus a dependence on two properties of the medium: Conductivity and dielectric constant. The behavior of the curves is, in such case, very similar: There are two plateaus, between which a transitional region lies. The upper plateau is the same for all dielectric constants, while the lower plateau depends on dielectric constant. Important is, consequently, the fact that, above a certain conductivity, an independence of conductivity and also of dielectric constant exists. With this knowledge, it becomes possible to limit the range of applicability of the measuring device to media, whose conductivity lies above this limit value. For these media, it is then also possible to store, and later use, reference matchings measured in the manufacture of the device.

A further dependency of the curves is that on the frequency of the activating signal (not shown here). The lower the frequency, the more the transition region moves left in the direction of lower conductivity value. The range is, in general, open on the upper end, while the lower, starting region is frequency dependent. Thus, by decreasing the frequency, a wider range of applicability can be achieved. Opposing this, however, is the fact that a lower frequency increases the influence of accretion on the probe unit. Accretion involves medium which adheres to the probe unit and, consequently, quasi shields the probe from the medium. Since accretion forms in the case of many media, it is, therefore, more advantageous to choose the frequency as sufficiently high as possible, such that a high accretion tolerance exists.

Figure 3:
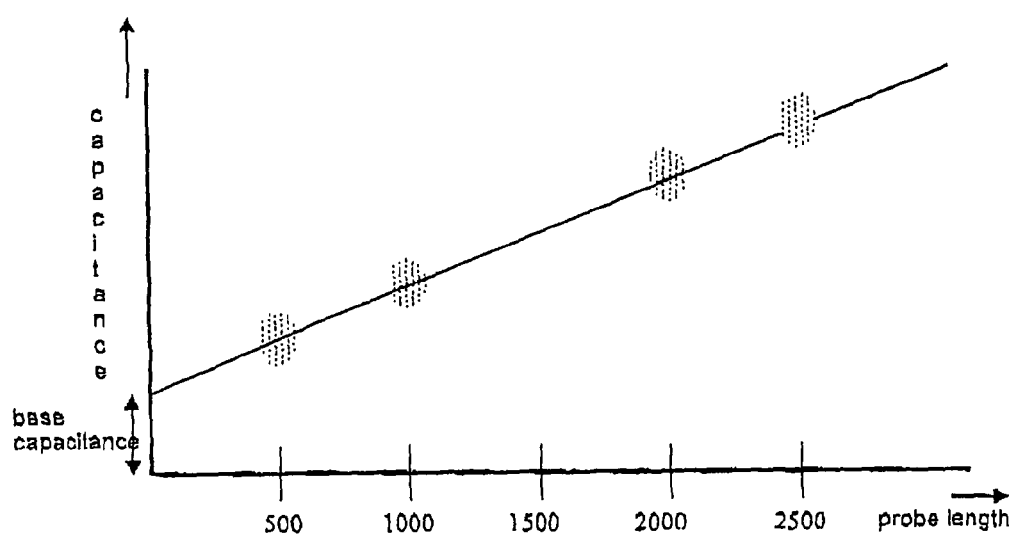
FIG. 3 an illustration of schematic results of measurements for determining matchings of capacitance value and fill level.

FIG. 3 shows the result of a method for producing reference matchings. Shown are the measured capacitance values (y-axis) of several probe units of known length (x-axis) for empty-calibration in air—i.e., except for air, there was no dielectric between the probe unit and the counter electrode. Due e.g. to manufacturing tolerances, some scatter is indicated in each point for each probe length. The values lie, however, generally on a straight line, so that also information is available for intermediate probe lengths. By extrapolating the measured values, it is possible to ascertain a base capacitance formed by the probe, electronics and mechanics (e.g. cable, feed-throughs, etc.). This base capacitance is the value of capacitance matched for the zero-calibration and via which the above calculations are possible.

Figure 4:
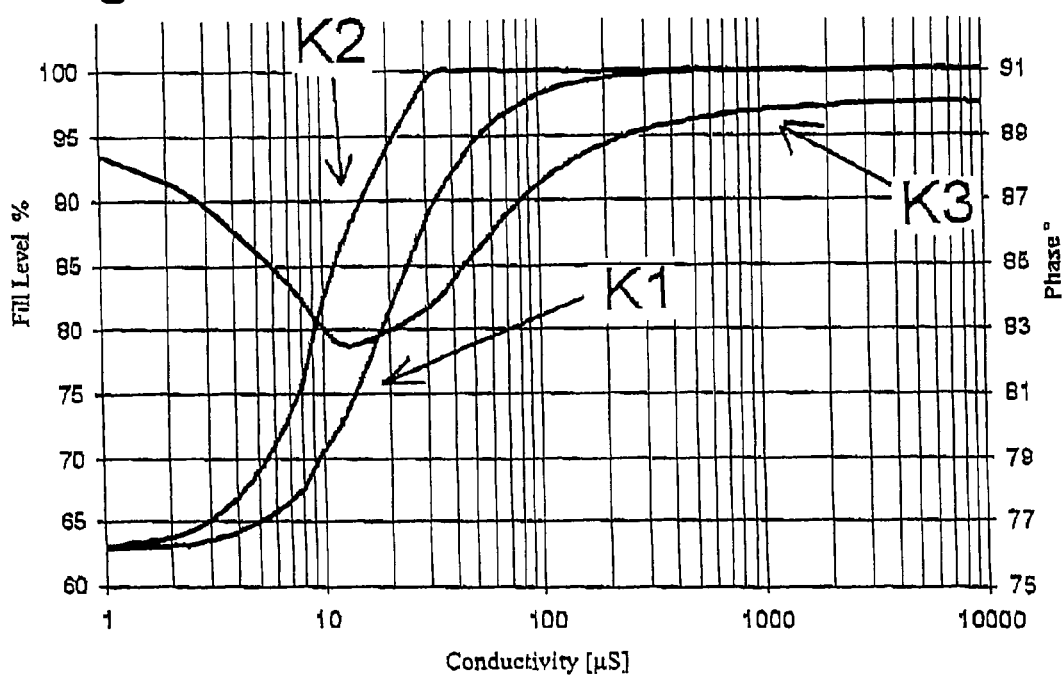
FIG. 4 curves illustrating optimizing of the evaluation algorithm.

FIG. 4 presents three curves K1, K2, K3. Two curves K1 and K2 show the effect of conductance of the medium on the ascertainment of fill level. The fill level (the left y-axis) of the measurement upon which these considerations are based lies at 100%. Due to the conductivity σ (x-axis) of the medium, however, different capacitance values result, which lead each to another fill-level value. Since, however, conductivity is usually not measured in operation, and since, simultaneously, factors such as temperature and humidity enter, there is a lack of certainty in the measurement. Curve K1 shows the behavior which results when, for a medium, only the amplitude of the response signal is evaluated. Although the fill level is 100%, the fill level ascertained from the capacitance value can lie between 63% and 100%, i.e. the error in the fill level ascertainment can be up to 37%. As in FIG. 2, curve K1 exhibits essentially two plateaus, between which a transitional region lies. Important, now, is that conductivity, beyond a certain value, exerts a negligible, or no, influence on the measurement (upper plateau). This means that, in that situation, reference matchings between capacitance value and fill level can be used largely independently of medium. Therewith, an idea of the invention should now become clear. Because, beyond a certain conductivity (which, in turn, depends on the frequency of the electrical, alternating voltage of the activating signal), the dependence on the medium drops away and this is true also for most dielectric constants (compare FIG. 2), it becomes possible, already during manufacture, to store reference matchings between capacitance value and fill level.

Curve K3 shows the dependence of phase (the right y-axis) of the response signal, relative to phase of the activating signal, on the conductivity a. If the capacitance value is ascertained from the amplitude (K1) and the phase (K3) of the response signal, then it is possible to optimize the evaluation algorithm, or evaluation formula, in such a manner that, in connection with these two pieces of information, the independence of conductivity is true for a greater range of conductivity. This is shown by the curve K2. As can be seen, curve K2 is shifted more to the left, as compared to curve K1, thus shifted in the direction of smaller conductivities. The allowable conductivity range begins here already at about 30 μS (at a measuring frequency of 250 kHz). Consequently, also the range of applicability of the measuring device is enlarged by this additional optimizing.

Figure 5:
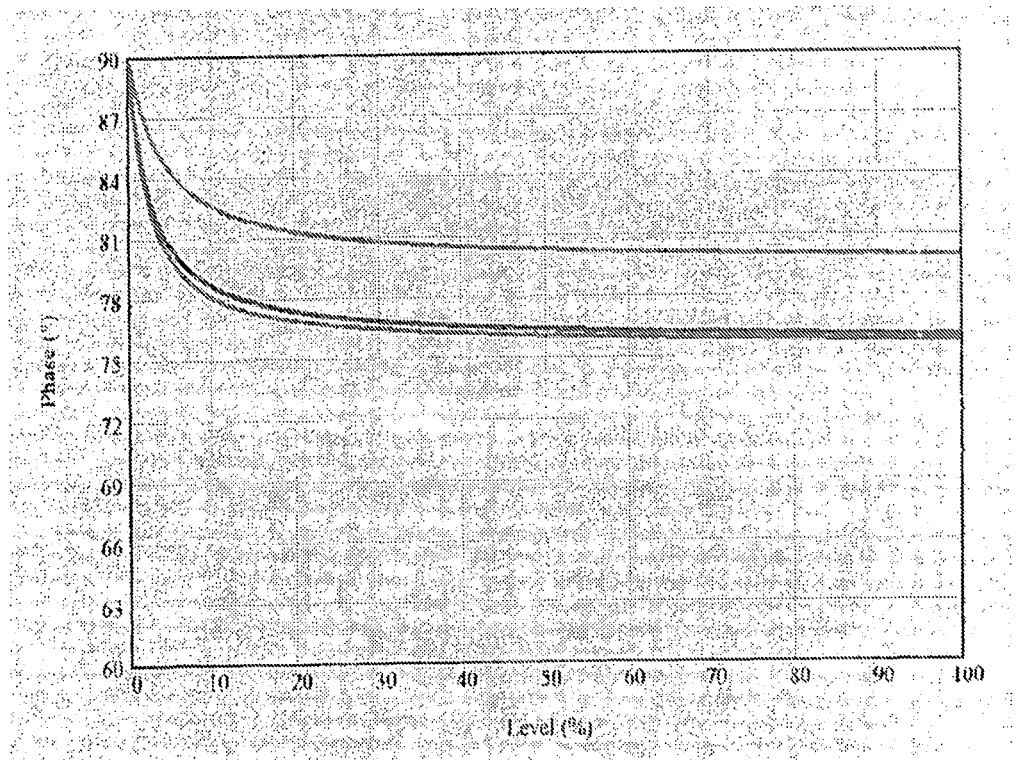
FIG. 5 schematic illustration of dependence of phase of the response signal on fill level.

In FIG. 5, three curves are presented for three media having dielectric constants (from bottom to top) of 2, 10 and 80. The conductivity is 50 μS. Shown is the dependence of phase of the response signal (y-axis) on fill level of the medium (x-axis, in percent). 90° is the phase obtained in the absence of medium. This is the expected phase difference between voltage and current for a capacitor. Depending on the embodiment of the separate components of the measuring device, deviations from this 90° are to be expected, which can, however, be directly ascertained. As can be seen, the phase of the response signal deviates more strongly from this value, the more the fill level rises, i.e. the more the dielectric of the capacitor formed by the probe unit and the container wall or a second probe unit increases. The behavior of the curve is, in such case, dependent on the dielectric constant of the medium. The smaller the constant, the stronger the fall. As can be seen, however, also the deviation of the phase from 90° is, at most, 15°, i.e. the phase never assumes a value smaller than 75°. The effect of the fill level on the phase of the response signal is thus limited to a phase range. Thus, in order that the measuring device not, in this way, again become medium dependent, it makes sense to define this region for all media, i.e., for this case with an activation signal frequency of 250-kHz, the phase range between 75° and 90°. An alternative formulation is that the difference between the measured phase $\phi_{measured}$ and the maximum phase $\phi_{max}$ is permitted to be only between 0° and 15°. If the phase lies within this range, then the fill level and an accretion on the probe unit can be responsible therefor. If the phase is, however, smaller than 75°, respectively the deviation is greater than 15°, then the accretion is dominant and a reliable statement concerning the fill level, especially when using the optimized calculational algorithm, is no longer assured. Therefore, in this case, the calculational algorithm is applied with a fixed, predetermined phase, e.g. 15°, thus with the maximum phase difference that can be caused alone by the fill level. Alternatively, a second calculational algorithm is used, which specially takes the dependence on accretion into consideration, or which, as largely as possible, avoids the effects of accretion. Alternatively, a warning can be issued, that a manual removal of accretion is required.

Figure 6:
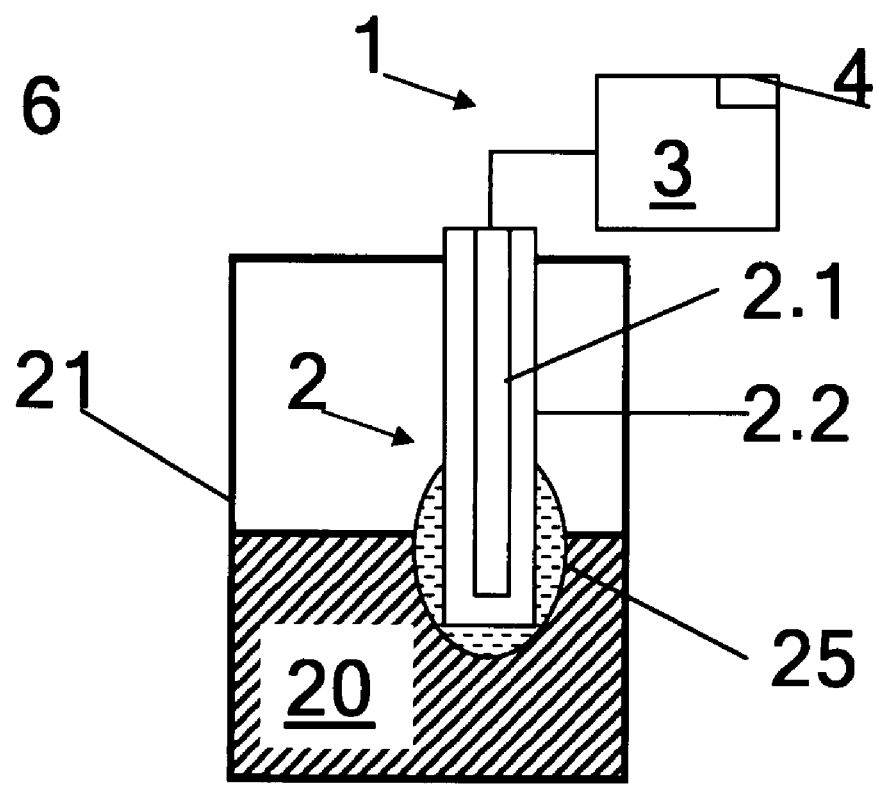
FIG. 6 a schematic illustration of a measured calibration during manufacture.

FIG. 6 shows, schematically, measurement of a reference matching between an adjustable fill-level value and the capacitance value ascertained in such case, during manufacture of the measuring device 1. The probe unit 2 here is composed of an actual probe rod 2.1 and an insulation 2.2 surrounding it. Probe rod 2.1 is supplied with an electrical, alternating voltage by the control/evaluation unit 3. The probe unit 2 is placed in the calibration container 21. The fill level of the calibration medium 20 is then adjusted to at least one predetermined value and the capacitance value ascertained in such case is then stored with the fill-level value in the memory unit 4, which is here a part of the control/evaluation unit 3. The calibration medium 20 is characterized by the fact that its conductivity a lies within the predetermined conductivity range, thus within the range in which the conductivity has no, or scarcely any, effect on the measured capacitance. Also shown schematically in the figure an accretion 25 is on the probe unit 2. Usually, accretion 25 is clinging, and even possibly dried, medium 10. Depending on the character of the medium, it can attach to the probe unit 2. Thus, accretion is formed, when, following sinking of the fill level, the medium 10 remains clinging to the probe unit 2 and e.g. dries there. Such an accretion 25 acts then like a metal sleeve, which has been drawn over the probe unit 2. The probe unit becomes quasi shielded thereby, and it can happen then that the fill level no longer is able to bring-about capacitance changes. For this reason, accretion 25 is a very important process condition, which is subject to changes, as a function of temperature or also time, over which the accretion is on the probe, above all, during changing of the fill level.

The invention claimed is:

1. A method for manufacturing-side calibration of a measuring device at the manufacturer's location for capacitive fill level measurement of a medium, comprising the steps of:
    activating at least one probe unit of the measuring device with an electrical, activating signal in the form of an electrical, alternating voltage of predeterminable frequency;
    ascertaining a conductivity range as a function of the frequency of the activating signal, within which fill level measurement is essentially independent of a change of electrical conductivity of the medium;
    producing at least a first reference matching between a predeterminable, first fill-level value and a first capacitance value belonging to the first fill-level value for the conductivity range; and
    recording the first reference matching between the first fill-level value and the first capacitance value.

2. The method as claimed in claim 1, further comprising the step of:
    predetermining the frequency of the activating signal in a manner such that accretion on the probe unit minimally affects fill level measurement.

3. The method as claimed in claim 1, further comprising the step of:
    producing at least one reference matching between a predetermined fill-level value and a capacitance value belonging to the fill-level value by the steps of: choosing, or adjusting, a calibrating medium in such a manner that electrical conductivity of the calibrating medium lies within the ascertained conductivity range, establishing the fill-level value in a calibration container with the calibrating medium, and ascertaining the capacitance value with the measuring device at the established fill level.

4. The method as claimed in claim 1, further comprising the step of:
    producing at least one reference matching between a predetermined fill-level value and a capacitance value belonging to the fill-level value by calculating the capacitance value, which is matched with the fill-level value of the medium.

5. The method as claimed in claim 1, further comprising the step of:
    producing at least one reference matching between a predetermined fill-level value and a capacitance value belonging to the fill-level value by selecting, from calculated and/or ascertained matchings between fill-level values and capacitance values, that capacitance value matched with the fill-level value.

6. A measuring device for capacitive fill level measurement of a conductive medium in a container, comprising:
    at least one probe unit, and
    at least one control/evaluation unit, which activates said at least one probe unit with an electrical, activating signal, and which receives from said at least one probe unit an electrical, response signal, wherein:
    in said control/evaluation unit, at least one calculational algorithm is stored, via which said control/evaluation unit ascertains, from the response signal of said probe unit, a capacitance value;
    the calculational algorithm is optimized in such a manner that a conductivity range results, within which the fill level measurement is essentially independent of a change of electrical conductivity of the medium; and
    said control/evaluation unit is embodied in such a manner that it evaluates phase of the response signal as regards an accretion located on said at least one probe unit.

* * * * *